United States Patent
Wang et al.

(10) Patent No.: US 11,537,260 B1
(45) Date of Patent: Dec. 27, 2022

(54) GRAPHICAL INDICATIONS AND SELECTORS FOR WHETHER OBJECT BEING SELECTED VIA AR DEVICE IS REAL OR VIRTUAL

(71) Applicant: Lenovo (Singapore) Pte. Ltd., Singapore (SG)

(72) Inventors: Song Wang, Cary, NC (US); Zhenyu Yang, Morrisville, NC (US); Jian Li, Durham, NC (US); Mengnan Wang, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/395,387

(22) Filed: Aug. 5, 2021

(51) Int. Cl.
  *G06F 3/04817* (2022.01)
  *G06F 3/04883* (2022.01)
(52) U.S. Cl.
  CPC ...... *G06F 3/04817* (2013.01); *G06F 3/04883* (2013.01)

(58) Field of Classification Search
  CPC .................................................. G06F 3/04817
  See application file for complete search history.

(56) References Cited

U.S. PATENT DOCUMENTS

| | | | |
|---|---|---|---|
| 2015/0052479 A1* | 2/2015 | Ooi | G06F 3/0482 715/810 |
| 2015/0177944 A1* | 6/2015 | Petrov | G06T 19/006 715/767 |
| 2020/0310561 A1* | 10/2020 | Connellan | G06F 3/03545 |
| 2021/0012113 A1* | 1/2021 | Petill | G06F 16/5866 |

* cited by examiner

*Primary Examiner* — Roland J Casillas
(74) *Attorney, Agent, or Firm* — John M. Rogitz; John L. Rogitz

(57) ABSTRACT

In one aspect, a headset may include at least one processor, a display accessible to the at least one processor, and storage accessible to the at least one processor. The storage may include instructions executable by the at least one processor to identify user input regarding a particular object and, based on the user input, present an icon on the display. The icon may indicate whether the particular object is a real-world object or virtual object. Subsequent to presentation of the icon, the instructions may then be executable to execute a command related to selection of the particular object.

20 Claims, 7 Drawing Sheets

GRAPHICAL INDICATIONS AND SELECTORS FOR WHETHER OBJECT BEING SELECTED VIA AR DEVICE IS REAL OR VIRTUAL

FIELD

The disclosure below relates to technically inventive, non-routine solutions that are necessarily rooted in computer technology and that produce concrete technical improvements. In particular, the disclosure below relates to graphical indications and selectors for whether an object being selected via an augmented reality (AR) device is real or virtual.

BACKGROUND

As recognized herein, electronic cut, copy, and paste commands are particularly difficult to perform using augmented reality (AR) headsets and other types of AR devices. As also recognized herein, this is at least in part due to the fact that both virtual objects and real-world objects might be visible to the user and might partially overlap each other from the user's perspective. This in turn can make accurately selecting the intended object frustrating and difficult, often times leading to unintentional selections. There are currently no adequate solutions to the foregoing computer-related, technological problem.

SUMMARY

Accordingly, in one aspect a headset includes at least one processor, a display accessible to the at least one processor, and storage accessible to the at least one processor. The storage includes instructions executable by the at least one processor to identify user input regarding a particular object and, based on the user input, present an icon on the display. The icon indicates whether the particular object is a real-world object or virtual object. Subsequent to presentation of the icon, the instructions are executable to execute a command related to selection of the particular object.

The user input may include gesture input performed in free space to select the particular object, such as a lasso gesture or a swipe gesture.

In some example implementations, the instructions may be executable to present the icon as part of a graphical user interface (GUI) presented on the display. The GUI may include one or more selectors related to a cut or copy command for the particular object.

In other example implementations, the icon may be selectable to confirm that the particular object was meant to be selected for execution of an ensuing cut or copy command. In these implementations, the instructions may then be executable to present a graphical user interface (GUI) on the display responsive to selection of the icon. The GUI in this example may include one or more selectors related to a cut, copy, and/or select all command for the particular object.

Still further, in some examples the icon may be a first icon, and the instructions may be executable to determine that an ambiguity exists regarding which of first and second objects is being selected via the user input. The first object may be a real-world object and the second object may be a virtual object. Based on the determination, the instructions may then be executable to concurrently present the first icon and a second icon on the display, with the first icon indicating that the first object is a real-world object and the second icon indicating that the second object is a virtual object. The first icon may be different from the second icon. Additionally, if desired the first icon may be selectable to indicate to the headset that the real-world object is being selected via the user input, and the second icon may be selectable to indicate to the headset that the virtual object is being selected via the user input.

In various examples, the particular object may include text printed on a real-world surface and/or text presented virtually via the display. Additionally, or alternatively, the particular object may include a non-text object existing in the real world and/or a non-text graphical object presented via the display.

In another aspect, a method includes identifying, at a device that presents augmented reality (AR) content, first user input regarding a particular object. The method also includes, based on the first user input, presenting an indication on a display of the device. The indication indicates whether the particular object is a real-world object or virtual object. The method then includes identifying second user input to cut or copy the particular object subsequent to presenting the indication and performing a respective cut or copy action based on the second user input.

The first user input may include voice input and/or a gesture performed in free space.

Additionally, if desired the method may include, subsequent to presenting the indication, identifying in a first instance the second user input to cut or copy the particular object. In these examples, the method may also include, subsequent to presenting the indication, identifying in a second instance third user input that the particular object was not meant to be selected. The second instance may be different from the first instance.

Also in some examples, the method may include presenting the indication as part of a graphical user interface (GUI) presented on the display. The GUI may include one or more selectors related to a cut, copy, and/or share command for the particular object. The one or more selectors may be different from the indication.

Still further, if desired the indication may include an icon denoting the particular object as being a real-world object or virtual object.

Also, if desired, the indication may be a first indication and the method may include determining that the user could be selecting either of a first object and a second object via the first user input. The first object may be a real-world object and the second object may be a virtual object. Based on the determining, the method may then include concurrently presenting the first indication and a second indication on the display. The first indication may indicate that the first object is a virtual object, and the second indication may indicate that the second object is a real-world object.

In still another aspect, at least one computer readable storage medium (CRSM) that is not a transitory signal includes instructions executable by at least one processor to identify user input regarding a particular object and, based on the user input, present an indication on a display. The indication indicates whether the particular object is a real-world object or virtual object. Subsequent to presentation of the indication, the instructions are executable to execute a command related to selection of the particular object.

Thus, in some examples the indication may be a first indication, and the instructions may be executable to determine that a first object and a second object at least partially visually overlap each other relative to a field of view of a user. The first object may be a real-world object and the second object may be a virtual object. Based on the determination, the instructions may be executable to concurrently present the first indication and a second indication on the display. The first indication may indicate that the first object is a real-world object, and the second indication may indicate that the second object is a virtual object.

Also in certain example implementations, the particular object may be a real-world object, the particular object may include text, and the instructions may be executable to, responsive to receipt of the command, cut, copy, and/or select the text as identified through optical character recognition.

The details of present principles, both as to their structure and operation, can best be understood in reference to the accompanying drawings, in which like reference numerals refer to like parts, and in which:

DETAILED DESCRIPTION

Figure 1:
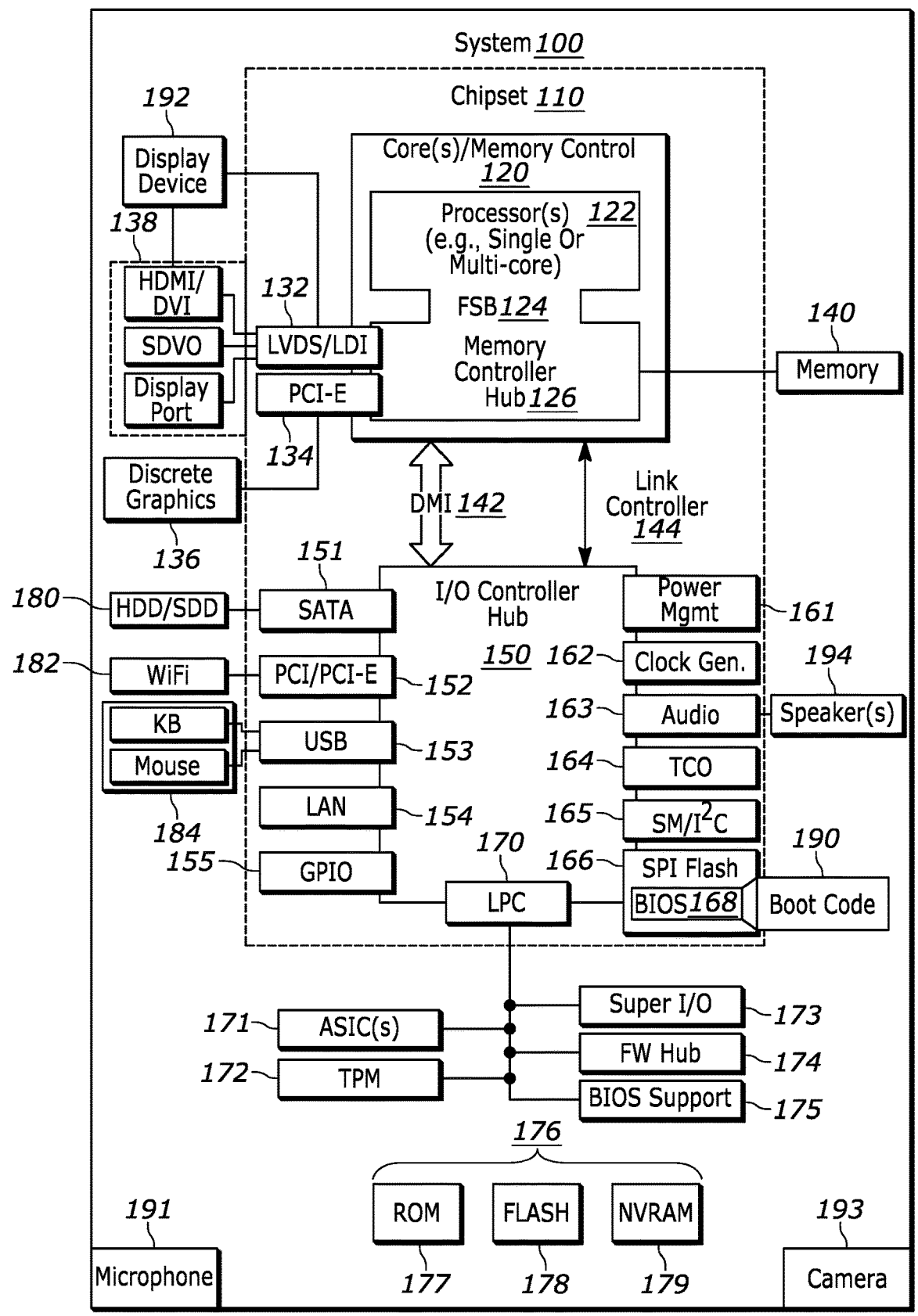
FIG. 1 is a block diagram of an example system consistent with present principles.

Among other things, the detailed description below discusses enabling a user to differentiate between virtual and physical content selection in an augmented reality (AR) environment, providing a natural and intuitive way to select text/image contents that can be either virtual or physical. The contents themselves can be used for copy/cut/paste purposes and other actions.

Thus, suppose a user wishes to perform a select function and then subsequently perform copy and paste actions to input selected text or images to a software application. Since the source of the content can come from both physical documents (e.g., a piece of paper the user is holding) or virtual documents (e.g., a virtual overlay that's displayed in front of the user's eyes), certain gestures and UI elements may be used to assist the user in distinguishing between physical and virtual content for selection via their AR glasses. This might be particularly useful when both types of contents overlap each other according to the user's view.

Accordingly, gestures in free space such as a finger swipe and/or lasso may be identified by the headset to determine the user desired-section of a text/image to select. A UI may also be used initiate and capture the gesture. Thus, a certain predefined gesture may be used to select text, images, and other objects that are physical and virtual. In certain examples, the gestures may be interchangeable depending on user preference. Additionally, other gestures besides finger swipes and lassos are possible. For example, the user may be given the freedom to define in the system which gestures he/she prefers for text and image selection (e.g., through a setup process with audio and/or visual prompts instructing the user to perform a desired content-selection gesture in free space for capture by the headset's camera to thus establish the performed gesture as an object selection gesture).

Also, again recognizing that AR glasses allow objects to be seen by the user that are both physical and virtual (e.g., AR glasses can overlay virtual text/images to the user, but at the same time the transparent display will also allow the user to see physical documents in front of him/her as well), to avoid false or unwanted content selection, a UI may be overlayed next to the application/contents currently used/seen by the user through the AR glasses for applying copy, select and paste functions. The system itself may already know which application and contents are displayed by the AR glasses as virtual content since it is presenting the virtual content in the first place, and the outward facing camera(s) on the AR glasses can capture the physical environment in front of the user's eyes. Text and object recognition can then be used to determine if real-world physical content in the user's physical environment can be converted to text/images. The UI can also be triggered to appear based on voice command if desired.

An example voice command may be "virtual content selection" or "physical content selection", and this voice command may trigger the appearance of corresponding virtual or physical indications for various objects potentially being selected already by the user and/or various objects that are currently in the direction of the user's gaze. The voice command may also trigger a GUI for virtual or real-world object selection.

E.g., when the AR glasses overlay a window containing virtual text/images, a virtual object UI icon for select/copy/paste may be overlayed next to content. At the same time, if user can also see through the glasses at physical documents containing text/images, a real-world object UI icon may also be overlayed on the glasses at a position proximate to the user's view of the real-world object. Thus, UI icons for selection and corresponding tools/selectors may differ between virtual and physical contents seen by the user, and this will help the user to identify which content he/she is selecting.

As indicated above, the AR glasses can also incorporate gaze selection and/or eye tracking for content/object selection. Subsequent copy, cut and paste commands can then be received based on a selection from a follow-up UI or receipt of a voice command.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general-purpose single- or multi-chip processor that can execute logic by means of various lines such as address lines, data lines, and control lines and registers and shift registers. Moreover, any logical blocks, modules, and circuits described herein can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing, or reading and writing information on one or more drives 180 such as HDDs, SDDs or a combination thereof, but in any case, the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still further, the system 100 may include an audio receiver/microphone 191 that provides input from the microphone to the processor 122 based on audio that is detected, such as via a user providing audible input to the microphone in the form of commands to select real or virtual objects as described herein. The system 100 may also include a camera 193 that gathers one or more images and provides the images and related input to the processor 122. The camera 193 may be a thermal imaging camera, an infrared (IR) camera, a digital camera such as a webcam, a three-dimensional (3D) camera, and/or a camera otherwise integrated into the system 100 and controllable by the processor 122 to gather still images and/or video.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
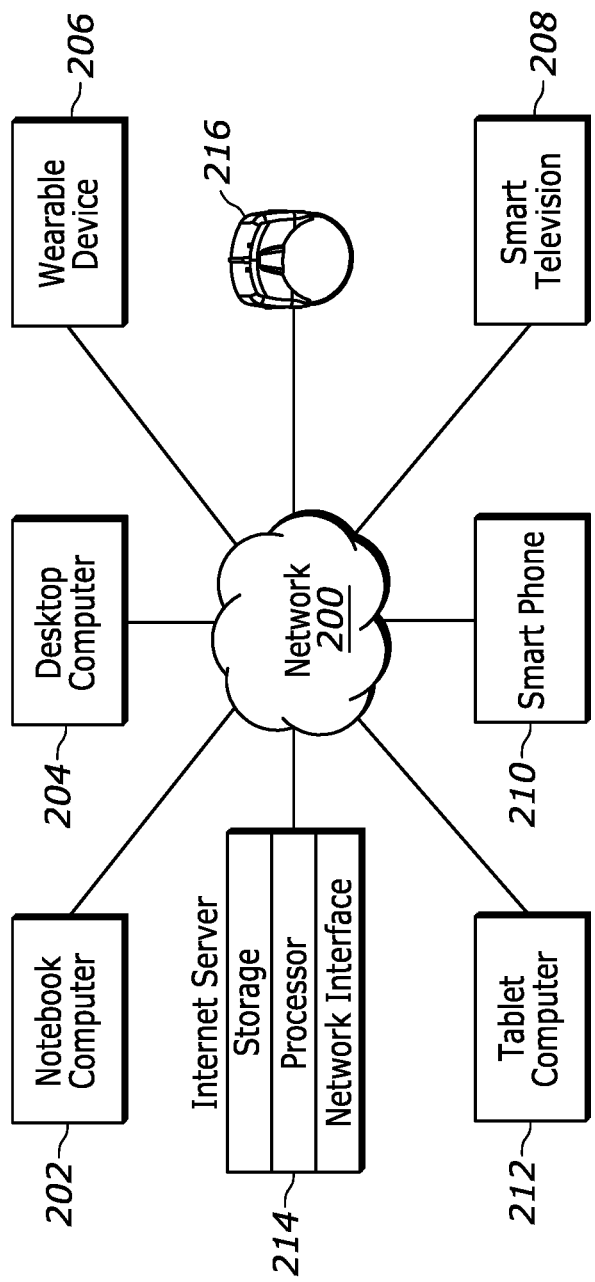
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a headset 216, and a server 214 such as an Internet server that may provide cloud storage accessible to the devices 202-212, 216. It is to be understood that the devices 202-216 may be configured to communicate with each other over the network 200 to undertake present principles.

Figure 3:
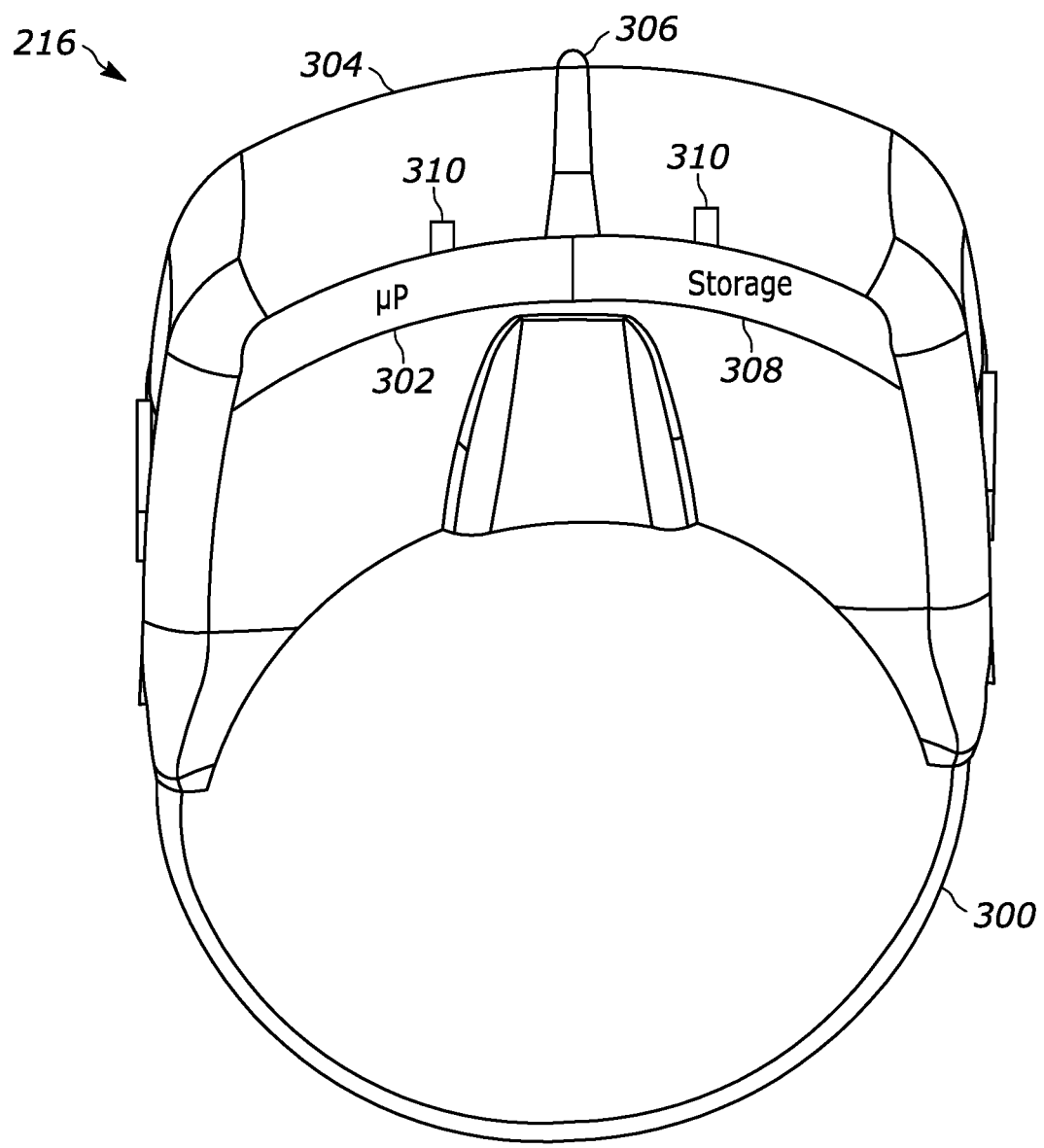
FIG. 3 is a top plan view of an example headset consistent with present principles.

Now describing FIG. 3, it shows a top plan view of an example AR headset such as the headset 216 consistent with present principles. The headset 216 may include a housing 300, at least one processor 302 in the housing, and a transparent "heads up" display 306 accessible to the at least one processor 302 and coupled to the housing 300. The display 306 may for example have discrete left and right eye pieces as shown for presentation using augmented reality software of stereoscopic and/or augmented reality images/ objects, such as presentation of virtual three-dimensional (3D) AR objects and other virtual content consistent with present principles.

The headset 216 may also include one or more forward-facing cameras 306. As shown, the camera 306 may be mounted on a bridge portion of the display 304 above where the user's nose would be so that it may have an outward-facing field of view similar to that of a user himself or herself while wearing the headset 216. The camera 306 may be used for gesture recognition and identifying real, tangible objects existing in real world space consistent with present principles. However, further note that the camera(s) 306 may be located at other headset locations as well.

Further, note that in some examples the camera(s) 306 may also be used for computer vision, image registration, spatial mapping, and/or simultaneous localization and mapping (SLAM) for augmented reality (AR) processing and presentation of AR content in conjunction with the headset's location in the real world itself. Further note that in some examples, inward-facing cameras 310 may also be mounted within the headset 216 and oriented to image the user's eyes for eye tracking while the user wears the headset 216 consistent with present principles.

Additionally, the headset 316 may include storage 308 accessible to the processor 302 and coupled to the housing 300, as well as still other components not shown for simplicity such as a network interface for communicating over a network such as the Internet, a microphone for detecting audio such as user commands as described further below, and a battery for powering components of the headset 216 such as the camera(s) 306. Additionally, note that while the headset 216 is illustrated as a head-circumscribing augmented reality (AR) headset, it may also be established by computerized smart glasses or another type of headset.

For example, the headset may be established by a virtual reality (VR) headset that may not have a transparent display but may still be able to present virtual AR objects/content on its display along with a real-world, real-time camera feed of an environment imaged by the front-facing camera(s) 306 to provide an AR experience to the user.

Figure 4:
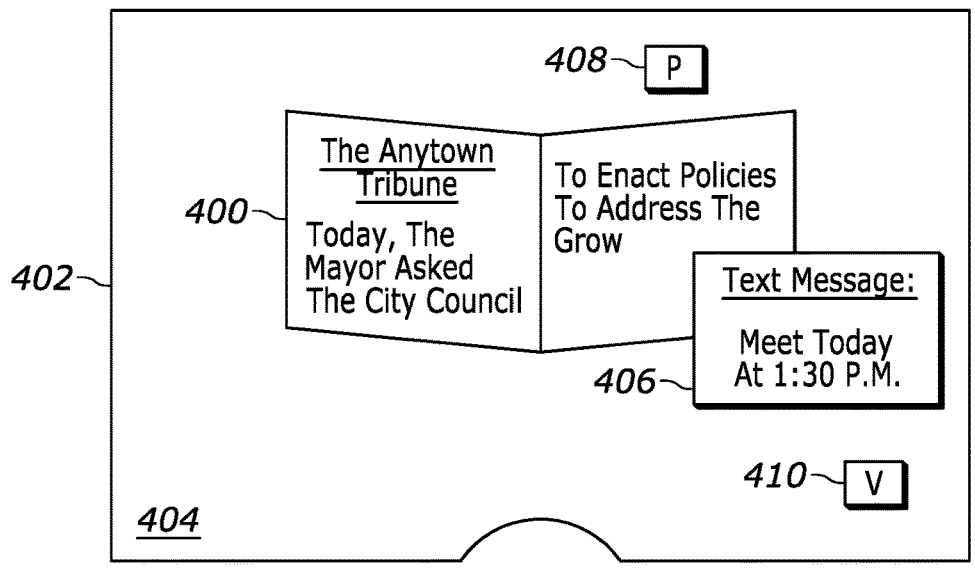
FIG. 4 illustrates the perspective of a user while wearing a headset and attempting to select real-world, printed text or virtual text consistent with present principles.

Referring now to FIG. 4, suppose a user is reading a tangible, real-world newspaper 400 through a transparent display 402 of AR glasses through which the real-world 404 may be viewed. The AR glasses may have components similar to the headset 216, for example. Also suppose the user receives a text message at his/her smartphone, that the smartphone is paired with the AR glasses, and that virtual content in the form of a text message notification 406 is presented on the display 402.

As may be seen from FIG. 4, the notification 406 at least partially visually overlaps the user's view of the newspaper 400 based on the user's current field of view through the display 402. Also suppose a user makes a gesture or provides another type of content/object selection command, specific examples of which will be discussed later, to select the word "growing" as printed on the right-side page of the newspaper 400 even though the text "ing" from the word "growing" is obscured from view owing to the notification 406 being presented over top of that portion of the word, possibly unexpectedly while the user is attempting to select the word "growing". Based on this, the AR glasses may determine that an ambiguity exists regarding which of the word "growing" and words from the notification 406 (e.g., "meet today") are being selected via the content/object selection command.

Based on that determination, the AR glasses may concurrently present a first icon/indication 408 and a second icon/indication 410 on the display. As shown in FIG. 4, in this example the first icon 408 includes a box with a "P" inside to denote the word "physical", as in the associated object proximate to the icon 408 (the newspaper 400) exists in the physical real-world 404. As also shown in FIG. 4, the second icon 410 includes a box with a "V" inside to denote the word "virtual", as in the associated object proximate to the icon 410 (the notification 406) is virtual and presented on the display 402. In certain examples, each icon 408, 410 may therefore be presented within a threshold non-zero X-Y distance (such as two centimeters) from the respective object itself relative to the field of view of the user so that the user can readily appreciate which icon relates to which object.

The user may then select either of the icons 408, 410 with an air tap gesture in free space to virtually touch the respective icon (e.g., recognized via gesture recognition), a voice command, or other user input. Selection of one of the icons 408, 410 may indicate to the headset that the associated real-world or virtual object is being selected via the content/object selection command.

Note that in some examples, selection of the respective icon 408, 410 may itself confirm that the respective text was meant to be selected via the previously-provided selection command, and the headset may therefore select the respective text itself per the previous selection command for use in a subsequent copy/paste action or other action based on selection of the respective icon 408, 410 itself. However, in other examples selection of one of the respective icon 408, 410 may instead indicate that an ensuing, second selection command will pertain to selection of part or all the respective real or virtual text of the respective real or virtual object itself that is associated with the selected icon.

Figure 5:
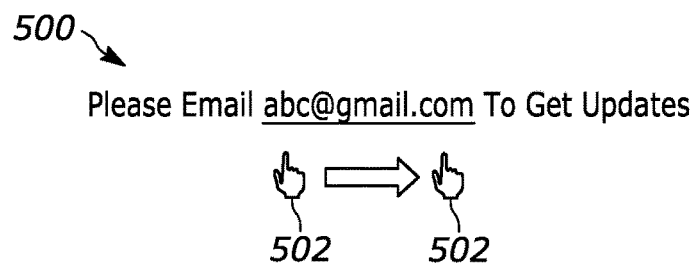
FIGS. 5 and 6 illustrate example gestures that may be performed for object selection.

Before moving on to FIG. 5, further note with respect to FIG. 4 that the icons 408, 410 may be presented responsive to other user input besides a text/object selection command as well. For example, a voice command may be provided to present the icons 408, 410 themselves so that the user may subsequently select one of the icons 408, 410 and afterwards select associated real or virtual text or other objects. Other objects may include virtual, non-text graphical objects such as 3D virtual avatars and other virtual objects, as well as real-world objects such as the newspaper 400 itself, an apple, a lamp, or other tangible objects existing in the real-world. If the selected object is a real-world object, an image from the headset's forward-facing camera may be used to extract an image of the selected object itself from the base camera image so that a new image is established that shows the object but not other items and space from the base image that surrounds the object.

In any case, reference is now made to FIG. 5, which illustrates an example object/content selection gesture in the context of selecting a text object in the form of a text string. As shown, text 500 as presented virtually on a headset display indicates "please email abc@gmail.com to get updates".

As also illustrated in FIG. 5, a user uses a finger on his/her hand 502 to perform a gesture in free space to select a subset of the text ("abc@gmail.com") with a left-to-right swiping gesture, attempting to touch the first character of the text subset and then swiping (and/or underlining) all the way in a continuous motion to the last character of the desired text subset. The user may do so based on where the text itself appears to be located in the real world owing to the text 500 being presented in AR. Note further that a right-to-left swiping gesture might also be used, but that in either case similar swiping gestures may also be used to select text printed on a real-world surface as well (e.g., by swiping against the physical surface itself from a first desired character to a last desired character of the text subset, or by swiping on the text from a distance even if out of arms-length from the user since the desired text may be identified based on gaze/eye tracking and/or pointing direction of the finger while making the gesture).

Figure 6:
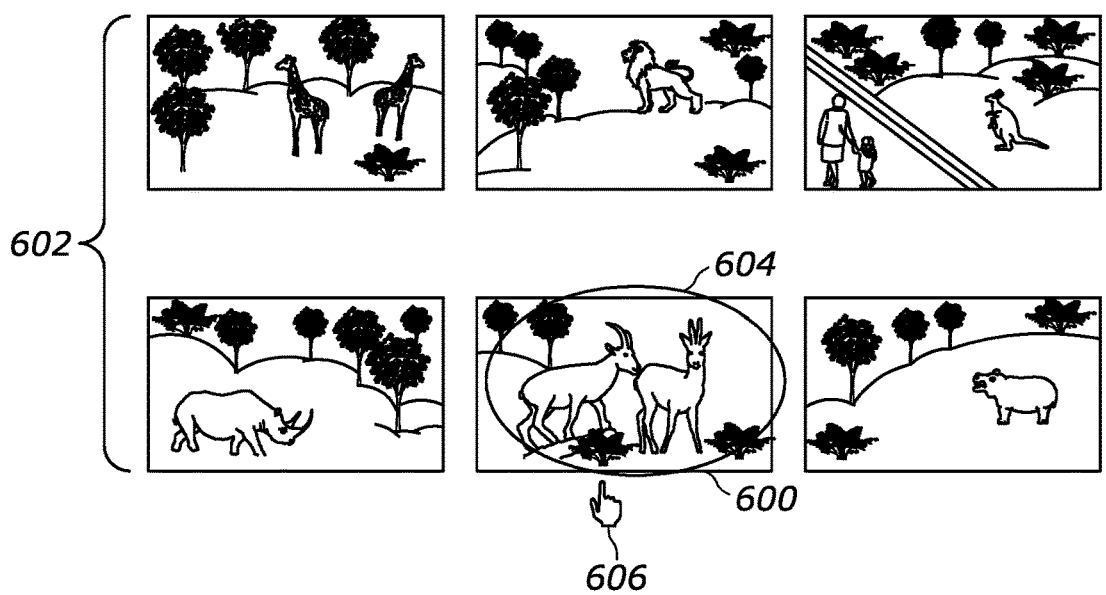

FIG. 6 illustrates another example object/content selection gesture, this time in the context of selecting a non-text object (a photograph) being presented virtually on a headset display. However, present principles would also apply even if the photographs of FIG. 6 were real-world, printed photographs that have been framed and mounted on a wall or printed on a common real-world surface such as a piece of paper.

In any case, in the example shown, a digital photograph 600 is being selected from among a set 602 of plural digital photographs. The selection is made via a free-space lasso gesture using an index finger or other finger of a user's hand 606, as indicated by the outline 604. Note here that the lasso gesture makes a hoop or non-perfect oval/circle in the air that, relative to the user's current field of view, surrounds most or all of the photograph 600. And again, note that images from a forward-facing camera on the user's headset as well as gesture recognition may be used to identify the gesture itself.

Further note that although the lasso gesture is described in reference to selecting a photograph presented virtually, a similar lasso gesture may be applied while touching a physical surface on which a set of photographs or other objects might be printed in order to select one of the printed photographs or other objects. A lasso gesture may also be used to encircle a real-world object out of arms-length from the user but that may still be identified from the user's gaze and/or pointing direction of the finger while making the gesture itself, whether the object is real-world text or something else.

Additionally, note that other content/object selection gestures besides swiping, and lassos may be used consistent with present principles. For example, for non-text objects, an air tap on or toward the object itself may be used to select the object. Boundary recognition may then be used to determine the boundaries of the object being selected if the object exists in the real-world, otherwise for a virtual object the headset may already know the boundaries. The object might then but pasted somewhere else according to the boundaries.

Figure 7:
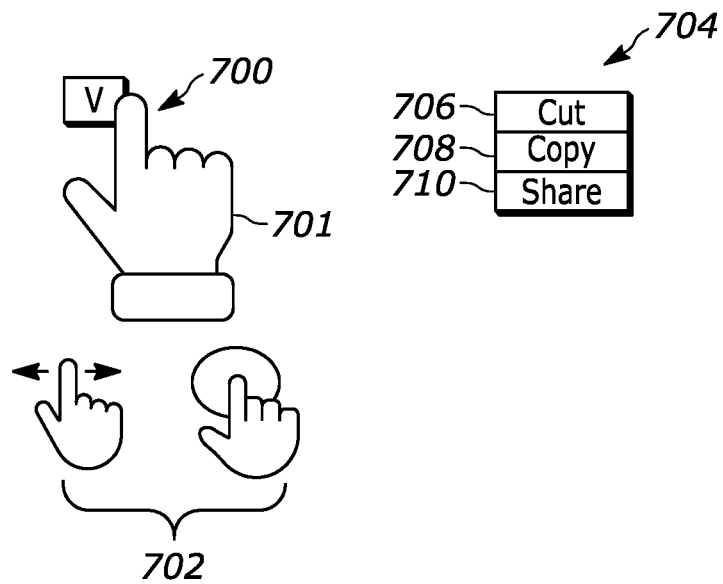
FIGS. 7 and 8 respectively illustrate example real and virtual object indication graphical user interfaces (GUIs) that may be presented on a headset display consistent with present principles.
Figure 8:
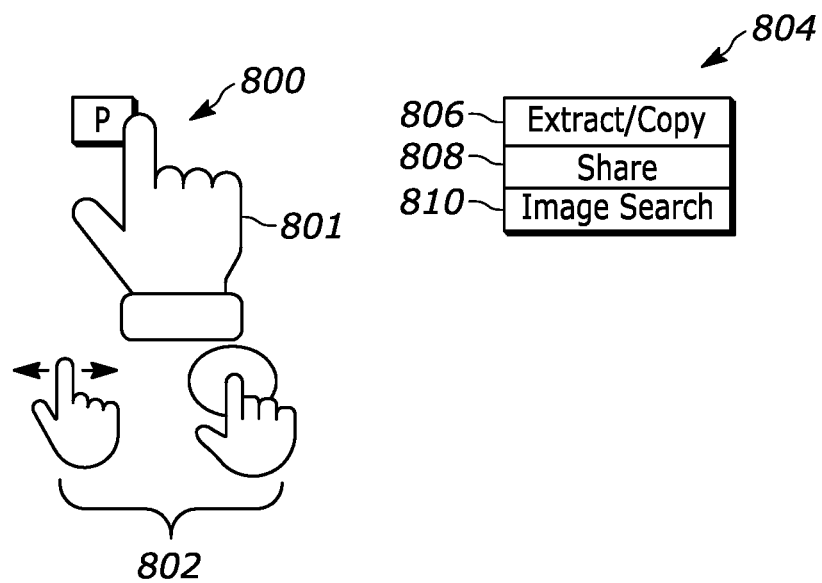

Continuing the detailed description in reference to FIGS. 7-8, they show additional examples of icons/indications that may be presented on a headset display to indicate whether an associated object is real or virtual. FIG. 7 shows an example related to a virtual object, while FIG. 8 shows an example related to a physical real-world object.

First in reference to FIG. 7, as shown an icon 700 includes a box with a "V" inside similar to as described above, but further includes a graphical hand 701 to further indicate that the icon 700 relates to object selection. Illustrations 702 may or may not be presented as part of the icon 700 but in either case illustrate two example gestures in free space that may be used to select the associated virtual object—a sideways swipe gesture and a lasso gesture.

Still further, in some examples the icon 700 may be presented as part of a graphical user interface (GUI) 704 presented on the headset display, with the GUI 704 including one or more selectors 706-710. Though not shown for simplicity, the GUI 704 might also include a thumbnail image of the associated object itself (e.g., beneath the selectors 706-710).

In the present example, the selector 706 may be selected via free-space gesture input, voice input, or other input to provide a cut command to the headset to cut the associated virtual object from its virtual location to a virtual clipboard for eventual pasting to another virtual location. The selector 708 may be selected to provide a copy command to the headset to copy the associated virtual object to the virtual clipboard for eventual pasting to another virtual location. The selector 710 may be selected to provide a share command to the headset to share the associated virtual object with another person via text message, email, social media, or other method. Other selectors may also be presented in addition to or in lieu of the selectors 706-710, such as a "select all" selector to select all text for a given page or window.

Before moving on to the description of FIG. 8, further note with respect to FIG. 7 that while the icon 700 is presented as part of the GUI 704 in the present example, in other examples the icon 700 may be presented alone as its own GUI and may establish a selector that may then be selected to subsequently present the selectors 706-710 as another GUI. In the former instance (the example shown in FIG. 7), the icon 700 and GUI 704 may be presented together and concurrently responsive to voice input such as "select object" as might be uttered by the user, or responsive to receiving ambiguous selection input as described herein. In the latter instance, the icon 700 may be presented first based on voice input or ambiguous selection input and then the icon 700 may be selected to confirm that the associated virtual object was meant to be selected (e.g., via prior input) and thus command the headset to subsequently present the selectors 706-710 (with or without still presenting the icon 700).

Turning now to FIG. 8, it shows an example of an icon that may be presented on a headset display to indicate that a related real-world object is indeed a physical, real-world object. As shown in FIG. 8, an icon 800 includes a box with a "P" inside similar to as described above, but further includes a graphical hand 801 to further indicate that the icon 800 relates to object selection. Illustrations 802 may or may not be presented as part of the icon 800 but in either case illustrate two example gestures in free space that may be used to select the associated virtual object—a sideways swipe gesture and a lasso gesture.

Still further, in some examples the icon 800 may be presented as part of a graphical user interface (GUI) 804 presented on the headset display, with the GUI 804 including one or more selectors 806-810. Though not shown for simplicity, the GUI 804 might also include a thumbnail image of the associated object itself.

In the present example, the selector 806 may be selected via free-space gesture input, voice input, or other input to provide an image extraction command and/or object copy command to the headset to extract an image of the associated object from an existing base image as described above (e.g., using photo editing software) and then maintain the extracted image in a virtual clipboard for pasting virtually to a digital file or other digital location or taking another action using the extracted image.

Thus, the selector 808 may be selected to provide a share command to the headset to share the extracted image of the associated real-world object with another person via text message, email, social media, or other method. The selector 810 may be selected to provide a command to the headset to perform a reverse image search where the extracted image is used as a search parameter to locate other images on the Internet that show the same or similar-type objects. Other selectors may also be presented in addition to or in lieu of the selectors 806-810, such as a "send to email" selector to send the extracted image to the user's own personal email account as an email attachment responsive to selection of the associated selector itself (e.g., without further user input beyond selecting the "send to email" selector).

As with FIG. 7, here again note with respect to FIG. 8 that while the icon 800 is presented as part of the GUI 804 in the present example, in other examples the icon 800 may be presented alone as its own GUI and may establish a selector that may then be selected to subsequently present the selectors 806-810 as another GUI. In the former instance (the example shown in FIG. 8), the icon 800 and GUI 804 may be presented together and concurrently responsive to voice input such as "select object" as might be uttered by the user, or responsive to receiving ambiguous selection input as described herein. In the latter instance, the icon 800 may be presented first based on voice input or ambiguous selection input and then the icon 800 may be selected to confirm that the associated physical object was meant to be selected (e.g., via prior input) and thus command the headset to subsequently present the selectors 806-810 (with or without still presenting the icon 800).

Figure 9:
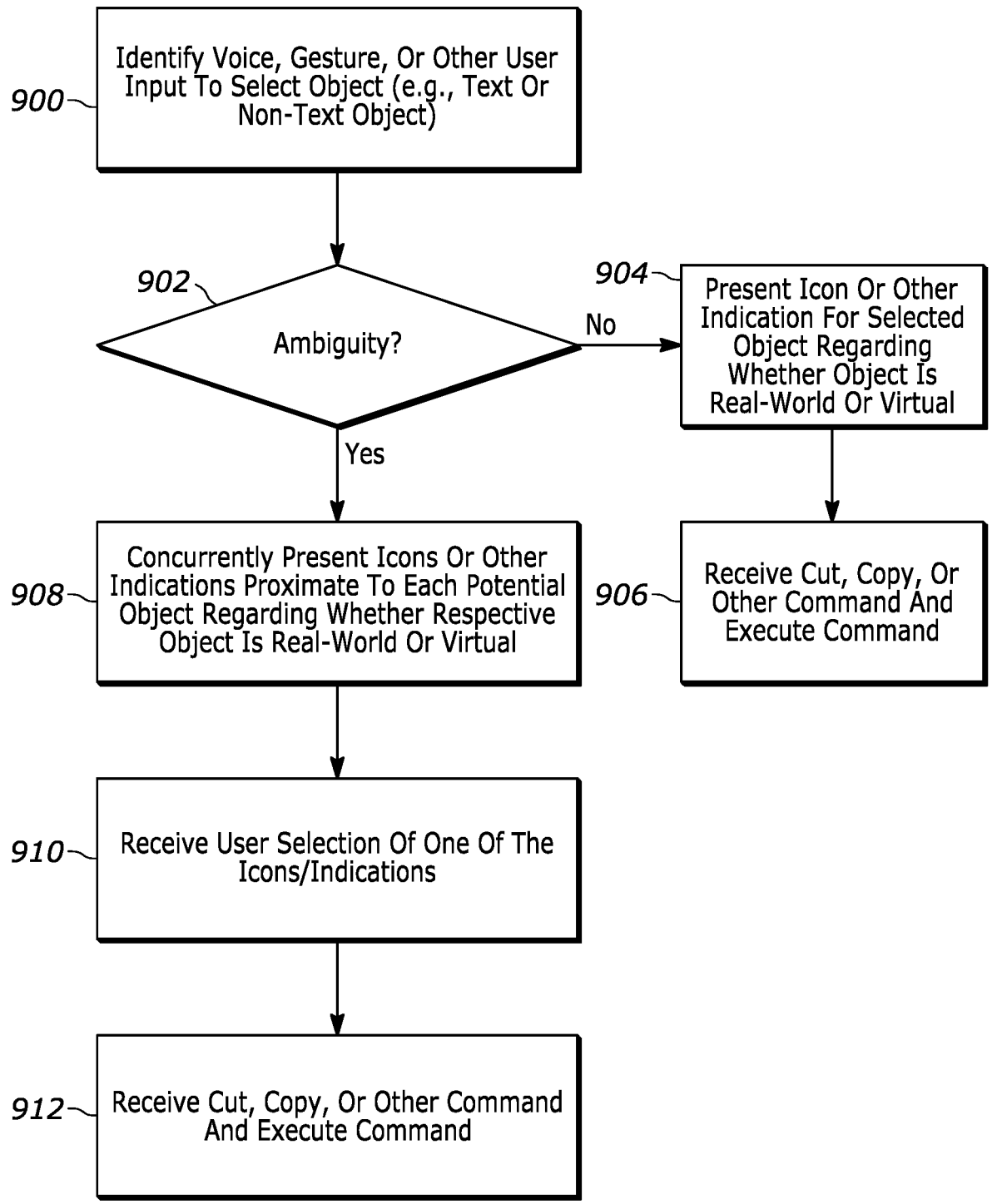
FIG. 9 illustrates example logic in example flow chart format that may be executed by a headset and/or other device consistent with present principles.

Continuing the detailed description in reference to FIG. 9, it shows example logic that may be executed by a device such as the system 100 and/or a headset in accordance with present principles, either alone or in conjunction with a remotely-located server if desired. Note that while the logic of FIG. 9 is shown in flow chart format, other suitable logic may also be used.

Beginning at block 900, the device may identify voice input (e.g., via voice recognition), gesture input (e.g., via gesture recognition), or other user input to select a particular real-world or virtual object. For example, at block 900 the device may execute eye tracking to track the user's eyes and determine an object at which the user is looking, or plural objects at which the user could potentially be looking, while the user speaks "select this object". In some examples, the headset may determine if the voice input specifically indicates that a virtual object or real-world object is meant to be selected and thus avoid potentially determining an ambiguity.

The logic may then proceed to decision diamond 902 where the device may determine whether an ambiguity exists as to whether the input received at block 900 pertains to one specific object or potentially plural objects, whether real and/or virtual (e.g., the user could be selecting either object or even could be selecting one object from among three or more).

As discussed above in relation to FIG. 4, an ambiguity may be determined based on a visual overlap of the objects from the user's perspective. An ambiguity may also be determined if the objects do not visually overlap but are still within a threshold X-Y distance to each from the user's perspective. Additionally, or alternatively, an ambiguity may also be determined based on the associated lasso or swipe gesture at least partially encompassing both objects, the associated voice input potentially applying to both objects, and/or the associated eye input potentially applying to both objects. Thus, an ambiguity might be determined if the device cannot affirmatively identify the user input as pertaining to one of the objects to within a threshold level of confidence as set by a system administrator or developer, whether the level of confidence pertains to a natural language understanding result for the voice input, a gesture recognition result for the gesture input, an eye tracking result for eye input, etc.

A negative determination at diamond 902 may cause the logic to proceed to block 904. At block 904 the device may present an icon or other indication for the selected object itself (e.g., the icon 700 or 800) regarding whether the selected object is real or virtual. Thereafter the logic may proceed to block 906 where the device may receive a cut, copy, or other command if it has not already received one as part of the input received at block 900 (e.g., the user might have spoken, "cut this text" while providing a gesture indicating the associated text itself). Also at block 906, the device may then execute the associated command itself. For example, if the command is in relation to virtual text, the headset may already know what the text is since it has presented it on the display and may thus cut or copy the text to the headset's virtual clipboard. As another example, if the command is in relation to real-world text presented on a real-world surface other than the headset display, the headset may receive one or more images from its forward-facing camera and execute text recognition (e.g., optical character recognition) to identify the text to then copy the text to the virtual clipboard.

However, if an affirmative determination is made at diamond 902 instead, the logic may instead proceed to block 908. At block 908 the device may concurrently present respective icons or other respective indications proximate to each respective object that the user could potentially be selecting, with each icon or other indication indicating whether the respective object is a physical, real-world object or a virtual object. The logic may then proceed to block 910 where the device may receive a user's selection of one of the icons/indications. Thereafter the logic may proceed to block 912 where the device may receive a cut, copy, or other command if it has not already received one as part of the input received at block 900, and then execute the associated command itself.

Figure 10:
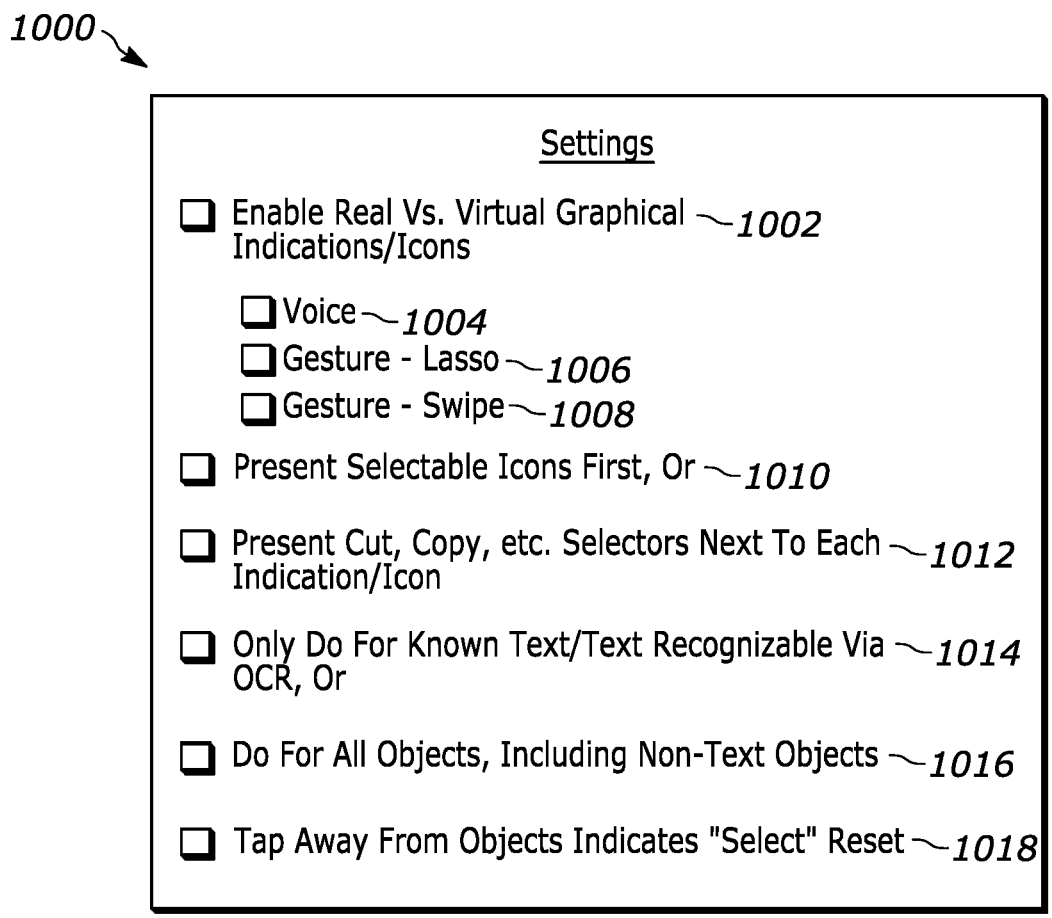
FIG. 10 shows an example GUI that may be presented to configure one or more settings of a headset to operate consistent with present principles.

Note before moving on to the description of FIG. 10 that even though not shown on the face of FIG. 9, if subsequent to presenting the indication(s) at blocks 904 or 908 the user decides that none of the objects for which the indications have been presented were meant to be selected, the user may provide additional user input indicating as much and the logic may revert back to block 900 to proceed therefrom. For example, the user may provide an air tap gesture with his/her index finger in a direction away from any of the objects for which the indications were presented. Voice input to "cancel" or other input may also be used.

Now describing FIG. 10, it shows an example GUI 1000 that may be presented on a headset display or connected device display (e.g., smart phone display) consistent with present principles. The GUI 1000 may be used for configuring one or more settings of the headset to implement present principles. In the example shown, each option or sub-option that will be discussed below may be selected by directing touch, cursor, voice, or other input to the respective check box adjacent to the respective option to select the respective option.

As shown, the GUI 1000 may include a first option 1002 that may be selected to set or enable the headset to undertake present principles. For example, the first option 1002 may be selected a single time to set or configure the headset to, for multiple future instances, execute the functions described above in reference to FIGS. 4-8 as well as to execute the logic of FIG. 9.

The option 1002 may be accompanied by sub-options 1004-1008. The sub-option 1004 may be selected to specifically set or enable the headset to monitor for and use voice input for content/object selection, while sub-option

1006 may be selected to set or enable the headset to monitor for and use lasso gesture input for content/object selection and sub-option 1008 may be selected to set or enable the headset to monitor for and use swipe gesture input for content/object selection. Other types of user input may also be listed as sub-options as appropriate.

Additionally, if desired the GUI 1000 may include options 1010 and 1012. Option 1010 may be selected to set or enable the headset to present selectable icons or other indications without also presenting additional selectors for specific actions to take in relation to the associated object itself, and in such an instance the additional selectors may be presented responsive to selection of the icon/indication. Conversely, option 1012 may be selected to set or enable the headset to present the icons/indications concurrently with presenting the additional selectors. The additional selectors may be, for example, the selectors 706-710 or 806-810 described above.

Still further, in some examples the GUI 1000 may include options 1014 and 1016. Option 1014 may be selected to set or enable the headset to only execute content/object selection commands in relation to known virtual text and/or recognizable printed text in the real-world (e.g., identified via optical character recognition). Option 1016 may be selected to set or enable the headset to execute content/object selection commands not just in relation to text but also non-text objects, whether real or virtual.

Additionally, the GUI 1000 may include an option 1018 to set or enable the headset for monitor for air taps away from objects for which respective physical or virtual icons/indications are presented (or other types of user input) in order to stop presenting the icons/indications and "reset", cancel, or start over. This might be useful where the headset presents indications for various objects, none of which were meant to be selected and so the user wants to try again.

Moving on from FIG. 10, it is to be understood that in some examples a user might not gesture in free space to select a real-world object but might instead physically touch the object with his/her index finger. A headset operating consistent with present principles may recognize as much using one or more of its cameras, and based on that the headset may present an icon or other graphical indication indicating that a physical, real-world object has been selected as described herein (possibly along with additional selectors like the selectors 806-810). Identification of physical touching may thus help the headset resolve an ambiguity or determine that there is no ambiguity in the first place since selecting a physical, real-world object is implied from the touching.

Also note consistent with present principles that a visual representation of a lasso or swipe line/underline for real or virtual object selection may be presented on the headset's display, and in some examples the representation may be adjustable by the user to include more or less of the object to conform to what is meant to be selected. In other examples, particularly where the selected object is not text, boundary recognition or other image processing techniques may be used to determine the boundaries of the respective object to be selected regardless of the precise bounds of the lasso or swipe gesture itself so that the object may be selected for a cut, copy, or other command using the actual boundaries.

Before concluding, further note that cut and copy commands and other commands for the various selectors described above are examples and that other commands may be provided via other selectors as well. For instance, a user might select an object to replace it with something already copied to the headset's virtual clipboard via pasting, and so a paste selector might be presented. As another example, a dictionary selector may be presented for a text content/object selection, whether real or virtual, to command the headset to access an electronic dictionary and then automatically present the user with a dictionary definition for a selected word.

It may now be appreciated that present principles provide for an improved computer-based user interface that increases the functionality and ease of use of the devices disclosed herein for a user to differentiate from and select virtual or real-world objects for cut, copy, and other actions when both real and virtual objects might be present. The disclosed concepts are thus rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A headset, comprising:
at least one processor;
a display accessible to the at least one processor; and
storage accessible to the at least one processor and comprising instructions executable by the at least one processor to:
identify user input regarding a particular object;
based on the user input, present an icon on the display, the icon indicating whether the particular object is a real-world object or virtual object; and
subsequent to presentation of the icon, execute a command related to selection of the particular object;
wherein the icon is a first icon, and wherein the instructions are executable to:
determine that an ambiguity exists regarding which of first and second objects is being selected via the user input, the first object being a real-world object and the second object being a virtual object; and
based on the determination, concurrently present the first icon and a second icon on the display, the first icon indicating that the first object is a real-world object, the second icon indicating that the second object is a virtual object, the first icon being different from the second icon.

2. The headset of claim 1, wherein the user input comprises gesture input performed in free space to select the particular object, and wherein the gesture input performed in free space comprises a lasso gesture.

3. The headset of claim 1, wherein the instructions are executable to:
present the first icon as part of a graphical user interface (GUI) presented on the display, the GUI comprising one or more selectors related to a cut or copy command for the particular object.

4. The headset of claim 1, wherein the first and second icons are respectively selectable to confirm that the respective first or second object was meant to be selected for execution of an ensuing cut or copy command.

5. The headset of claim 4, wherein the instructions are executable to:
responsive to selection of the first icon, present a first graphical user interface (GUI) on the display, the first GUI comprising at least a first selector related to a copy command for the first object; and responsive to selection of the second icon, present a second GUI on the display, the second GUI comprising at least a second selector related a copy command for the second object.

6. The headset of claim 1, wherein the first icon is selectable to indicate to the headset that the real-world object is being selected via the user input, and wherein the second icon is selectable to indicate to the headset that the virtual object is being selected via the user input.

7. The headset of claim 1, wherein the instructions are executable to:

present a settings graphical user interface (GUI) on the display, the settings GUI comprising one or more options that are configurable by a user, the settings GUI comprising a first option that is selectable a single time to set the headset to, for multiple future instances of object selection, present respective icons on the display indicating whether a selected object is a real-world object or virtual object.

8. The headset of claim 1, wherein the instructions are executable to:

present the first and second icons on the display within a threshold non-zero X-Y distance of the respective first and second objects.

9. The headset of claim 1, wherein the first and second icons are both virtual.

10. The headset of claim 1, wherein first object is different from the first icon, and wherein the second object is different from the second icon.

11. The headset of claim 1, wherein the instructions are executable to:

determine that the ambiguity exists based on a visual overlap of at least some portions of the first and second objects according to a user's field of view.

12. A method, comprising:

identifying, at a device that presents augmented reality (AR) content, first user input regarding a particular object;

based on the first user input, presenting an indication on a display of the device, the indication indicating whether the particular object is a real-world object or virtual object;

subsequent to presenting the indication, identifying second user input to cut or copy the particular object; and performing a respective cut or copy action based on the second user input;

wherein the indication is a first indication, and wherein the method comprises:

determining that a user could be selecting either of a first object and a second object via the first user input, the first object being a real-world object and the second object being a virtual object and based on the determining, concurrently presenting the first indication and a second indication on the display, the first indication indicating that the first object is a real-world object, the second indication indicating that the second object is a virtual object.

13. The method of claim 12, comprising:

presenting the first indication as part of a graphical user interface (GUI) presented on the display, the GUI comprising one or more selectors related to a cut, copy, and/or share command for the first object, the one or more selectors being different from the first indication.

14. The method of claim 12, wherein the first indication comprises a first icon denoting the first object as being a virtual object and wherein the second indication comprises a second icon denoting the second object as being a real-world object, the first icon being different from the second icon.

15. The method of claim 12, comprising:

presenting a graphical user interface (GUI) on the display, the GUI comprising a first option that is selectable a single time to enable the device to, for multiple future instances, present respective indications on the display indicating whether a selected object is a real-world object or virtual object.

16. The method of claim 12, comprising:

determining that the user could be selecting either of the first and second objects based on a visual overlap of at least some portions of the first and second objects according to the user's field of view.

17. The method of claim 12, wherein the first indication is selectable to indicate to the device that the real-world object is being selected via the first user input, and wherein the second indication is selectable to indicate to the device that the virtual object is being selected via the first user input.

18. At least one computer readable storage medium (CRSM) that is not a transitory signal, the computer readable storage medium comprising instructions executable by at least one processor to:

identify user input regarding a particular object;

based on the user input, present an indication on a display, the indication indicating whether the particular object is a real-world object or virtual object; and subsequent to presentation of the indication, execute a command related to selection of the particular object;

wherein the indication is a first indication, and wherein the instructions are executable to:

determine that a first object and a second object at least partially visually overlap each other relative to a field of view of a user, the first object being a real-world object and the second object being a virtual object; and based on the determination, concurrently present the first indication and a second indication on the display, the first indication indicating that the first object is a real-world object, the second indication indicating that the second object is a virtual object.

19. The CRSM of claim 18, wherein the instructions are executable to:

present a graphical user interface (GUI) on the display, the GUI comprising a first option that is selectable a single time to set a device to execute the determination and concurrent presentation steps for multiple future instances of object selection.

20. The CRSM of claim 18, wherein the first indication is selectable to indicate to the at least one processor that the real-world object is being selected via the user input, and wherein the second indication is selectable to indicate to the at least one processor that the virtual object is being selected via the user input.

* * * * *